United States Patent [19]

Johnson et al.

[11] 4,346,600
[45] Aug. 31, 1982

[54] STRESS SENSOR PARTICULARLY SUITABLE FOR ELASTIC, PLASTIC AND VISCO-ELASTIC MATERIALS

[75] Inventors: Jerome B. Johnson, Goleta, Calif.; Gordon F. N. Cox, Thetford, Vt.

[73] Assignee: Global Marine Inc., Los Angeles, Calif.

[21] Appl. No.: 172,678

[22] Filed: Jul. 28, 1980

[51] Int. Cl.³ .............................................. G01L 1/10
[52] U.S. Cl. ..................................................... 73/768
[58] Field of Search ........... 73/768, 778, 784, DIG. 1, 73/862.59

[56] References Cited

U.S. PATENT DOCUMENTS

| | | | |
|---|---|---|---|
| 2,650,991 | 9/1953 | Ketchledge | 73/784 |
| 3,635,076 | 1/1972 | Sacks et al. | 73/784 |
| 3,742,757 | 7/1973 | Callahan | 73/768 |
| 4,175,445 | 11/1979 | Templeton | 73/768 |

FOREIGN PATENT DOCUMENTS 496712 12/1976 Australia .............................. 73/768

*Primary Examiner*—Anthony V. Ciarlante
*Attorney, Agent, or Firm*—Christie, Parker & Hale

[57] ABSTRACT

A cylindrical stress sensor has a case that is long relative to its diameter. The case may be completely imbedded in the body of a host material in which a change of stress is of interest. That portion of the sensor which is imbedded has a rounded end. The rounded end, circular cross section, and relatively large length-to-diameter ratio avoid errors occasioned by stress concentration. A strain transducer of a vibrating wire excited by a magnetic coil is located remote from any imbedded end of the sensor. Changes in strain on the wire alter the frequency of the wire. This change in frequency is picked up by the excitation coil as a signal. A stacked, three-transducer array, with the wire of each transducer at 45° from a neighboring transducer, can detect changes in the magnitudes and directions of the principal stresses, without first establishing the direction of the primary or secondary principal stress. The effective Young's modulus of the sensor is large relative to the host material, being at least equal to, or greater than, four times the latter's modulus. The distance from a transducer to an end of the sensor to be imbedded in the host is sufficient to avoid erroneous signals occasioned by end effects of the case, and is usually at least ten radii.

12 Claims, 5 Drawing Figures

STRESS SENSOR PARTICULARLY SUITABLE FOR ELASTIC, PLASTIC AND VISCO-ELASTIC MATERIALS

BACKGROUND OF THE INVENTION

The present invention relates to stress sensors in general. In particular, it considers the construction of a stress sensor and a method for adapting the instrument for imbedding into a material in which knowledge of the stress changes is desired.

Many environments present changing stresses that are of interest. For example, in mines it is important to monitor changes in stress in rock formations to determine possible impending failures.

Studies have shown that there is a maximum value of stress concentration factor for a circular rigid inclusion of approximately 1.5 times the stress applied to the body. This maximum is approached rapidly when the ratio of the effective Young's modulus of the inclusion to Young's modulus of the host material is greater than four. When the inclusion is this stiff, the stress induced in it is largely independent of the strain of the host material and the inclusion acts as a stress meter.

The stress in ice is of interest, for example, in areas where petroleum drilling platforms are to be used. For example, stresses in an ice sheet are important in platform design as they affect ice loads on the platform. Changes in the stress field, if known and if sufficiently serious, can allow for accommodation or corrective action.

Estimates of ice stresses obtained by considering the failure strength of sea ice may be too conservative in many applications. For example, in landfast ice areas, stresses may be smaller due to grounded pressure ridges and rubble piles, imperfections, and stress concentrations in the ice sheet. Also, landfast ice areas may be protected from the pack ice by the shear zone and barrier islands.

In addition, it is desirable to monitor ice stress to understand how the stresses relate to ice movement. Knowledge of stress near a structure, far field stress, and vertical stress gradients in an ice sheet may be of interest.

It is important in such monitoring to have the monitors reliable, simple, and without large power demands. The monitor signals should be easily transmitted. It is desirable also to have a gauge that is linearly responsive, accurate, responds immediately to applied loads, affords a means for determining the direction of applied stress, insensitive to creep deformation, and insensitive to temperature changes and differential thermal expansion between the host material and the gauge.

An existing stress sensor is described in U.S. Pat. No. 4,159,641 to Hawkes. This stress sensor uses a vibrating wire excited to vibrate at its natural frequency by a strong magnetic field. The natural frequency of the wire is a function of strain on the wire. An operator controls the frequency of the field and finds a "plucking" frequency at about the natural frequency of the wire. The device has a three-pole electromagnet constituted of a yoke and a permanent magnet. The yoke provides two poles of the same polarity, say South, and the permanent magnet provides a single pole of opposite polarity, say North. As induced magnetic field in the wire has corresponding poles of opposite polarity. The frequency of the modulated magnetic field can be varied with a known control. The coil and magnet also detect wire vibration. The permanent magnet induces a local magnetic field in the wire. As the wire moves, it appears as a changing magnetic field to the coil, inducing a voltage in it. This voltage has a frequency corresponding to the frequency of the vibrating wire, and accordingly the frequency of the wire is directly determined as a voltage signal. In this design, because the coil and magnet assembly is used for both plucking and signal detection, wire excitation must be followed by a period of "listening" for the return signal. Known digital logic circuitry can be used to count and display the frequencies.

A different stress sensor has a thin profile and a diaphragm. The cell can be circular or rectangular. The diaphragm type of cell endeavors to provide an instrument that is flat and stiff relative to the host to be studied. This cell attempts to avoid a high "aspect ratio", which is thought to produce greater stress at the cell than the stress in the far field. This design recognizes that the stiffer diaphragm cell, the less sensitive the cell is to changes in the Young's modulus of the host.

Another type of strain measuring device deforms with the host material without reinforcing it in any way. This device measures the strain in the host by relative movement of two fixed points on the cell.

A photoelastic type of stress indicating instrument ascertains the magnitudes of the primary and secondary principal stresses in a biaxial stress field from isochromatic fringe patterns in a hollow, cylindrical stress meter. The photoelastic stress meter consists of a hollow core glass cylinder bounded around its periphery in a hole drilled or cast in the host being studied. The stresses in the body are transmitted to the meter where they are revealed as isochromatic fringe patterns when the meter is viewed with polarized light. The fringe pattern gives the directions, signs, and magnitudes of the two principal stress components in the plane of the meter.

The stress sensor described in U.S. Pat. No. 4,159,641 has a partially cylindrical body with one side milled flat. A platen and wedge cooperate with the flat to secure the gauge into the body being studied. The overall length of the platen is small, relative to the sensing zone of the instrument. This type of instrument requires an open bore hole to be maintained in the host material and cannot be completely imbedded. Imbedding produces anomalous stress concentrations in the ends of the instrument that induce errors in the instrument's read-out. The requirement of the wedge assembly to secure the instrument into the body being studied results in the inability of the gauge to be used in material exhibiting extensive time dependent deformation, creep, such as ice. This inability results from the prestressing required by the wedge assembly. The problems associated with an open bore hole and creep also occur with photoelastic sensors.

SUMMARY OF THE INVENTION

The present invention provides an improved stress sensor that can be completely imbedded in a host body being studied. The instrument can be used easily in the field with the output recorded remotely. The instrument can be used in elastic and visco-elastic materials undergoing creep or time dependent deformation.

In general, the present invention contemplates an elongated case with at least one end of the case being adapted to be imbedded in a host body. The end is preferably rounded, as a hemisphere. A stress sensing transducer is remote from the end to isolate the transducer from stress concentrations at the end. The sensor's case has a high effective Young's modulus, relative to the host.

In the form preferred at present the invention includes a long case, preferably of circular cross section. A stress sensing transducer within the case is remote from an end of the case adapted to be imbedded in the host material to be studied. In the event that the other end of the case is adapted to be imbedded in the host, then the transducer is remote from that end as well. The sensor is stiff, relative to the host material, and the ratio of the Young's modulus of the host material to effective Young's modulus of the sensor is equal to, or less than 0.25. It has been found that the distance between the end of the case adapted to be imbedded in the host and the transducer should be long enough to minimize errors caused by stress concentrations imposed by the host material at the end of the sensor; this distance is usually at least ten times the radius of the sensor.

A specific form of the present invention is capable of sensing biaxial stress. It employs at least three strain transducers oriented successively at different angles from some reference axis, say at about 45° from each other, in one cylindrical stress sensor. In other words, with reference to an axis along one of the transducers, the transducers may be oriented 0°, 45°, and 90°. This permits within one case the determination of the magnitudes and directions of the primary and secondary principal stresses without the need for a triad arrangement of uniaxial sensors. This type of arrangement can also be used to indicate vertical stress differences by having two families of three sensors each, all in a common case, oriented along the axis of the instrument.

Preferably, the stress transducers employ cylindrical rings with tensioned wires. These wires are excited by an electromagnetic device, preferably of the type described in U.S. Pat. No. 4,159,641, which uses a coil yoke and a permanent magnet to effect three poles magnetically coupled to the wire. The wire, when plucked, induces a voltage in the coil that can be used to determine the frequency of the wire, or its period. The wire's frequency varies as a function of stress. Changes in stress of the host material are reflected by changes in strain in the wire and by the frequency of the wire.

In some applications, for example, where the host is ice, it is not necessary to completely imbed the case, and it is even desirable to have the top of the instrument above the ice. In this application, the free end need not be of the special configuration, and the stress transducer can be close to the top.

These and other features, aspects and advantages of the present invention will become more apparent from the following description, appended claims, and drawings.

DESCRIPTION OF THE PREFERRED EMBODIMENTS

The present invention provides a stress sensor suitable for sensing stress fields in a host body with the sensor imbedded in the host, or at least an end of the sensor imbedded in the host. This facility has not been possible before because an imbedded end led to unacceptable errors in stress indication, occasioned by non-linear stress concentrations of imbedded ends. Because of these concentrations, the conventional wisdom has been to avoid imbedding the instrument entirely within the body being tested. Rather, the instrument was secured in a bore hole with the ends of the instrument free. The type of instrument, such as shown in U.S. Pat. No. 4,159,641, using a platen and wedge, is typical. There, the stress passes into the stress sensing portion of the instrument through the platen and wedge, and a cylindrical wall of the gauge behind the platen and wedge. End effects are avoided because no stress is applied on the ends of the instrument.

As useful as this type of instrument might be, it is not suitable for investigations is host materials that experience time dependent deformation or creep, such as ice. With creep, the ends of an instrument will experience stress within the time of the test, and error will result. It is considerably easier to imbed stress sensing instruments in the likes of ice than to provide bore hole mounting. The instrument is merely dropped into a hole and frozen in place. This compares favorably with the more difficult platen and wedge mounting.

In general, the present invention provides a stress sensing instrument that can be imbedded within a host body by isolating the ends of the instrument from the stress sensing portion of the instrument. An elongated case of the instrument with rounded caps avoids, or substantially attenuates, the effect of anomalous stress concentrations at the sensing portion of the instrument. In addition, the cross section of the instrument is made circular so that the instrument is not direction sensitive. It is preferred to use as a stress sensing transducer a tensioned wire excitable by an electromagnetic circuit, which also signals the frequency of the wire, in a manner similar to U.S. Pat. No. 4,159,641.

Figure 1:
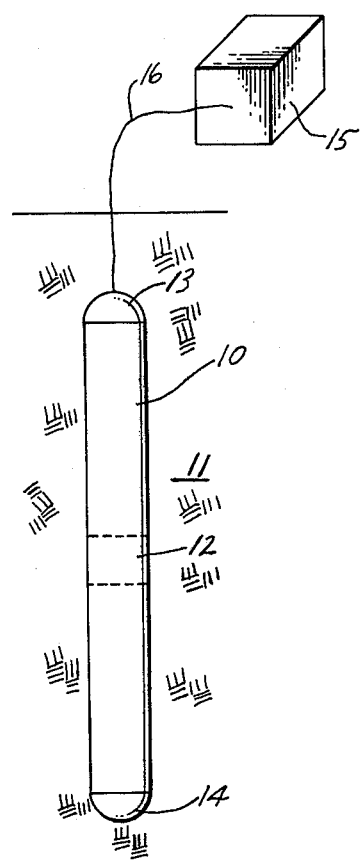
FIG. 1 illustrates in elevation a stress sensor imbedded in a host body, with the sensor being constructed in accordance with a preferred embodiment of the present invention.

With reference to FIG. 1, a preferred form of the stress sensor is illustrated. There, an elongated case 10 is imbedded in a host body 11 of material to be tested. A stress sensing transducer 12 intermediate end caps 13 and 14 of the sensor senses change in stress in the host material. The distance between the transducer and each end of the case is preferably at least about five diameters (10 radii). Stated differently, the overall length of the case that does not include stress sensing transducer 12 is about ten diameters (20 radii). What is important is that stresses at the end of the case do not affect the performance of the transducer and this 10 radii relationship has been observed to get the result. In a given application, some value less than 10 will suffice. The case should have a wall thickness and Young's modulus which make it stiff relative to the host. The wall thickness, cylinder diameter, and Young's modulus determine the effective Young's modulus. End caps 13 and 14 of the case are rounded to reduce stress concentrations that would otherwise occur at the ends and which could find their way to transducer 12. If desired, further uncoupling of the ends of the case from the transducer can be accomplished by forming the portions of case 10 on either side of transducer 12 as extensions of the case, separate from the transducer wall, and coupling them to the transducer through a loose joint. It is also preferred to have the transducer of a ring type that uses a tensioned wire in the manner that will be described in detail subsequently. In this type of transducer it is highly desirable to have the effective modulus of elasticity of the stress sensitive transducer wall considerably greater than the modulus of elasticity of the host material to avoid the necessity of knowing the modulus of elasticity of the host material. When adequately stiff, the instrument becomes sensitive only to stress in the host. This is accomplished when the Young's modulus of the host divided by the effective Young's modulus of the transducer wall is equal to or less than 0.25. ($E_h/E_s \leq 0.25$, where $E_h$=Young's modulus of host, and $E_s$=effective Young's modulus of the sensor.)

The effective Young's modulus of the instrument's case is determined by the Young's modulus of the casing material, the wall thickness of the cylinder, and the diameter of the cylinder. For example, a large diameter gauge would require a thicker wall in order to have the same effective modulus as a thinner wall, smaller diameter gauge of the same material.

A power source 15 couples the transducer 12 through a cable 16, which can be a multiple lead cable. As will be developed, this coupling can also provide the means for transmitting a signal from the transducer to an appropriate read-out receiver or recorder, all in accordance with well known technology.

Figure 2:
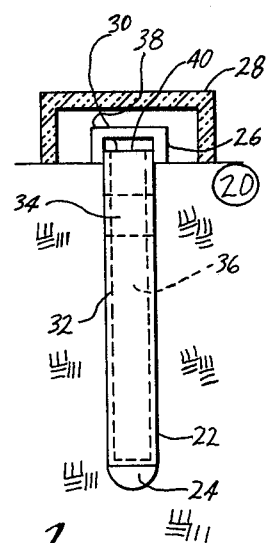
FIG. 2 illustrates in elevation, and somewhat in cross section, an embodiment of the present invention having particular utility for such host bodies as ice.

FIG. 2 illustrates an embodiment of the invention that has particular application where the test body is ice. Here, ice is indicated by reference numeral 20. A stress sensor 22 is imbedded in this ice. The stress sensor has a rounded end cap 24 imbedded in the ice. A free end 26 of the sensor is above the ice. An insulated housing 28 covers the free end. A handle 30 is secured to the sensor and enables it to be pulled from the ice. An elongated, cylindrical case 32 extends from the free end to the cap. A stress sensing transducer 34, spaced from end 24 by the requisite five diameters, is situated to determine the changes in stress in the ice. Again, the preferred transducer is the rigid ring and wire type. A heating tape 36 within case 32 can be heated to melt the ice on the outside of the case to permit withdrawal of the instrument. Power may be supplied through an appropriate cable 38 to the heating tape. A cable 40 from transducer 34 provides the power to operate its electromagnet and provides means to receive a signal from the vibrating wire.

Figure 3:
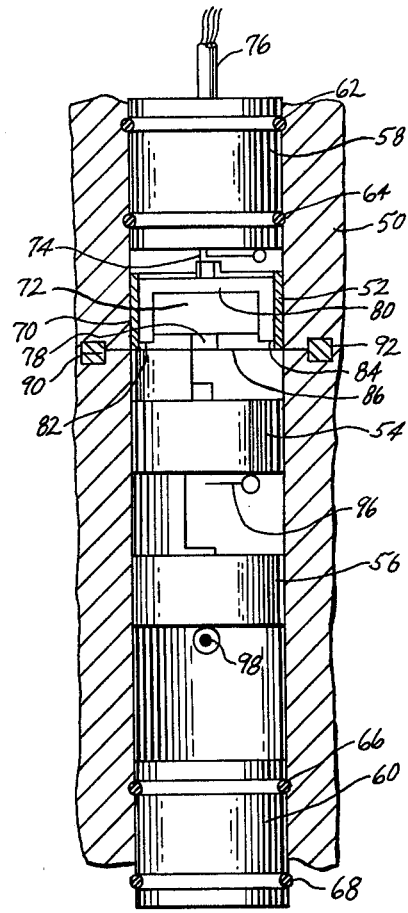
FIG. 3 is an elevational view, partly in half section, of a multiple sensor array of the stress sensor of the present invention.

FIG. 3 illustrates in greater detail the preferred construction of the transducer portion of the stress sensor. In FIG. 3 a biaxial transducer is illustrated. In particular, a rigid cylindrical case 50 forms a part of three transducers 52, 54, and 56. Each transducer is identical to the others and so only one will be described. The transducers are disposed between a plug 58 at the top and a plug 60 at the bottom. Appropriate O-ring seals 62 and 64 of plug 58 seal off the transducers below the plug from the bore of the case above the plug. Similar O-ring seals 66 and 68 seal off the bottom of the cylinder from space occupied by the transducers.

Again, the stress sensor wall is rigid relative to its host material. It has been found that an effective Young's modulus of $3 \times 10^7$ psi, wall thickness of 0.3125 inches, a diameter of 1.125 inches, and a Poisson ratio of 0.25 are adequate when the test material is ice. Again, the ends of the stress sensor are remote from the transducers. The ends are not shown in FIG. 3 because of the adequate showing of this feature in FIGS. 1 and 2.

Transducer 52 includes a shell 70 that contains a coil 72 energized by a lead 74 from a harness 76. A permanent magnet 78 is within the coil. A yoke pole piece 80 provides, in addition to the end of the permanent magnet, two additional poles of the same polarity, 82 and 84. The electromagnet is energized by current flowing in lead 74.

A tensioned wire 86 is held in the walls of case 50, as by swaged collars 90 and 92. These collars grip the ends of the wire and hold the wire tautly between them.

The wire is excited to resonance by a modulating magnetic field. The frequency of the modulation is dependent upon the frequency of the current provided the coil. This can be readily adjusted by an operator. In any event, with a rough knowledge of the resonance frequency of the wire the required coil frequency to initiate resonance can be readily found. With the expanding and collapsing magnetic field, the tensioned wire is attracted to the pole pieces of the yoke and the permanent magnet and is released from such attraction. The natural frequency of the wire is given by the following formula:

$$f = \frac{1}{T} = \frac{1}{2L}\sqrt{\frac{\sigma g}{\rho}} = \frac{1}{2L}\sqrt{\frac{E\,eg}{\rho}}$$

where:
f=frequency
T=period
L=length of wire
δ=stress in wire
g=gravitational constant
ρ=density of wire
E=Young's modulus of wire
e=strain As can be seen from this relationship, the natural frequency of the wire is a direct function of strain, hence the stress in the wire. Accordingly, the natural frequency changes as the strain in the wire changes. The strain in the wire is a direct function of the field stress of the host because that stress deforms the wall of the case at the wire.

The frequency of the wire can be determined by the coil because movement of the vibrating wire in the magnetic field established by the permanent magnet induces a voltage in the coil.

Figure 4:
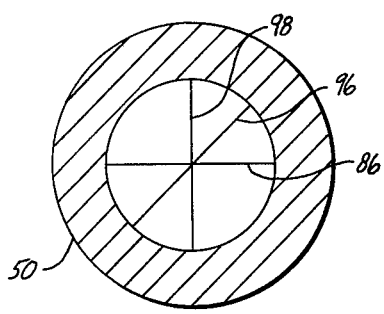
FIG. 4 is a view in cross section showing the 45° displacement of stress sensing wires from each other.

As can be seen in FIG. 4, the orientation of the wires of the stress indicating transducers are at 45° to one another. In FIG. 4, wire 86 of transducer 52 is shown extending horizontally. A second wire 96 of transducer 54 extends at 45° to wire 86. A third wire 98 of transducer 56 extends at 45° to wire 96, and 90° from wire 86. It can be said that the transducers are at 0°, 45°, and 90°. As is known, this type of array results in a biaxially sensitive instrument where the primary and secondary principal stress changes can be determined from the following general relationship.

To determine the principal stress directions and magnitudes, three measurements of stress, $v_r$, must be obtained at three different angles.

$$v_{r1} = (p+q)A + (p-q)B \cos 2\theta \qquad \text{I}$$

$$v_{r2} = (p+q)A + (p-q)B \cos 2(\alpha_1 + \theta) \qquad \text{II}$$

$$v_{r3} = (p+q)A + (p-q)B \cos 2(\alpha_2 + \theta) \qquad \text{III}$$

where:
$v_r = Le/2$
L = length of vibrating wire
e = strain of wire
p = primary principal stress magnitude
q = secondary principal stress magnitude
$v_{r1}$ = radial displacement at 1st angle
$v_{r2}$ = radial displacement at 2nd angle
$v_{r3}$ = radial displacement at 3rd angle A and B are constants determined by stress sensor parameters: radius, Young's modulus, Poisson's ratio, inner diameter; and outer diameter, and host parameters: Young's modulus and Poisson's ratio.

One of the transducer wires is oriented in a known direction, $\alpha_1$ is the angle of the second transducer wire from the reference wire, and $\alpha_2$ is the angle of the third transducer wire from the reference wire.

Equations (I) through (III) can be used to solve for the unknown primary and secondary principal stress magnitudes and directions: p, q, and $\theta$.

These solutions are:

$$\theta = \tfrac{1}{2} \tan^{-1} \left\{ \frac{\left[(1-\cos 2\alpha_2) - \frac{\sin 2\alpha_2}{\sin 2\alpha_1}(1-\cos 2\alpha_1)\right]}{\left[\sin 2\alpha_2 - \frac{(1-\cos 2\alpha_2)}{(1-\cos 2\alpha_1)} \sin 2\alpha_1\right]} \times \frac{\left[1 - \frac{(1-\cos 2\alpha_2)}{(1-\cos 2\alpha_1)}\right] v_{r1} + \left[\frac{(1-\cos 2\alpha_2)}{(1-\cos 2\alpha_1)}\right] v_{r2} - v_{r3}}{\left[1 - \frac{\sin 2\alpha_2}{\sin 2\alpha_1}\right] v_{r1} + \frac{\sin 2\alpha_2}{\sin 2\alpha_1} v_{r2} - v_{r3}} \right\} \qquad \text{IV}$$

$$p + q = \frac{v_{r1} \sin 2(\alpha_2 - \alpha_1) - v_{r2} \sin 2\alpha_2 + v_{r3} \sin 2\alpha_1}{A(\sin 2(\alpha_2 - \alpha_1) - \sin 2\alpha_2 + \sin 2\alpha_1)} \qquad \text{V}$$

$$p - q = \frac{v_{r1} - A(p+q)}{B \cos 2\theta} \qquad \text{VI}$$

for $\alpha_1 = 45$, $\alpha_2 = 90$ $$p - q = \frac{v_{r1} - A(p+q)}{B \cos 2\theta} \qquad \text{VII}$$

$$\theta = \tfrac{1}{2} \tan^{-1} \left[ \frac{v_{r1} - 2v_{r2} + v_{r3}}{v_{r1} - v_{r3}} \right] \qquad \text{VIII}$$

$$p + q = \frac{v_{r1} + v_{r3}}{2A} \qquad \text{IX}$$

The choice of $\alpha_1 = 45°$ and $\alpha_2 = 90°$ is a matter of convenience.

The preferred form of the present invention utilizes the three transducer array in order to avoid the requirement of knowledge of the direction of the principal stresses. Uniaxial stress sensors, however, can be produced in accordance with the principles of this invention, if the advantages of biaxial indication are not required.

Figure 5:
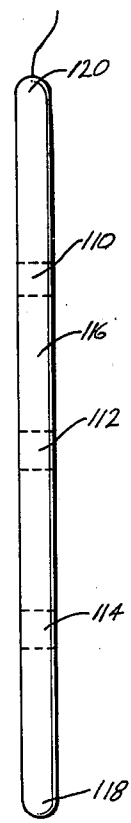
FIG. 5 is an elevational view showing an embodiment of the present invention adapted for determining vertical stress differences.

FIG. 5 illustrates another form of the present invention that has particular utility in determining changes in a vertical stress field that might occur, for example, in ice. This Figure illustrates three families of stress indicating transducers at 110, 112, and 114. These transducers are all encased in an elongated case 116. The ends of this case are rounded at 118 and 120 to afford the same isolation from end stress concentrations accomplished in the other embodiments of the invention described earlier. The same consideration of distance between the ends and the transducers obtains for the FIG. 5 embodiment as in the earlier described embodiments. It should be noted that the distance between transducer family 110 and transducer family 112, and between transducer family 112 and transducer family 114 can be considerable depending on the desired test range of the host. The distance between a transducer and the end of the instrument is still five diameters (10 radii). The considerations of Young's modulus ratio of the transducer walls to the host and maintaining these walls circular still applies. Preferably, each transducer family consists of three vibrating wire transducers, each oriented at an angle with respect to an adjoining one of the transducers, in the manner previously described.

In use, the present invention is particularly valuable in determining stress concentration in hosts such as ice, where, as a practical matter, it is very convenient to imbed the entire sensor in the host and not be concerned about stress applied to the ends of the sensor by the host material. As illustrated in FIG. 2, in most ice applications it is desirable to have the ends of the transducer exposed so that they can be retrieved, serviced and relocated. Placement of the transducer in the ice is exceedingly simple. A hole is bored in the ice and the transducer placed in the hole and frozen into position. There is no requirement for an elaborate platen and wedge arrangement, for example. Removal can be expedited by energizing heat tape.

The present invention has been described with reference to certain preferred embodiments. However, the spirit and scope of the appended claims should not necessarily be limited to the foregoing description.

What is claimed is:

1. An improved stress sensor for imbedding in a host material comprising:
   (a) a rigid, elongated case having an effective Young's modulus relative to the host material to produce a ratio of the Young's modulus of the host material to the effective Young's modulus of the case of less than or equal to 0.25, and at least one end adapted to be imbedded in the host material; and
   (b) at least one stress sensing transducer secured in the case and directly sensitive to stress induced on the case, the transducer being remote from the end that is adapted to be imbedded such that stress anomalies on such end do not affect the transducer.

2. The improved stress sensor claimed in claim 1 wherein the case is cylindrical in cross section and the end that is adapted to be imbedded is rounded.

3. The improved stress sensor claimed in claim 2 wherein the distance between the end that is adapted to be imbedded and the transducer is at least 10 times the radius of the case.

4. The improved stress sensor claimed in claim 3 including means to heat the case and free the stress sensor from a frozen host material.

5. The improved stress sensor claimed in claim 4 wherein there are three of the transducers, each transducer being of the vibrating wire type, the transducer wires being oriented at predetermined angles with reference to an axis that is coaxial with one of the wires.

6. The improved stress sensor claimed in claim 5 wherein the predetermined angles are 0°, 45°, and 90°.

7. The improved stress sensor claimed in claim 1 including at least three of the stress sensing transducers oriented at angles to each other.

8. The improved stress sensor claimed in claim 7 wherein the transducers are oriented at 0°, 45°, and 90° from a reference axis.

9. The improved stress sensor claimed in claim 7 wherein each transducer is of the vibrating wire type.

10. The improved stress sensor claimed in claim 9 wherein the case is cylindrical in cross section and the end that is adapted to be imbedded is rounded.

11. The improved stress sensor claimed in claim 10 wherein the distance between the end that is adapted to be imbedded and the transducer is at least 10 times the radius of the case.

12. The improved stress sensor claimed in claim 10 wherein there are at least two sets of three of the transducers spaced from each other to determine vertical stress in the host material.

* * * * *

UNITED STATES PATENT AND TRADEMARK OFFICE
CERTIFICATE OF CORRECTION

PATENT NO. : 4,346,600

DATED : Aug. 31, 1982

INVENTOR(S) : Johnson et al.

It is certified that error appears in the above–identified patent and that said Letters Patent are hereby corrected as shown below:

Column 1, line 65, "As" should be --An--; Column 2, line 31, "bounded" should be --bonded--; Column 4, line 29, "is" should be --in--; Column 7, line 32, "IV" should be at line 44.

Signed and Sealed this

Twenty-third Day of November 1982

[SEAL]

Attest:

Attesting Officer

GERALD J. MOSSINGHOFF

Commissioner of Patents and Trademarks